US007961357B2

(12) United States Patent
Kim et al.

(10) Patent No.: US 7,961,357 B2
(45) Date of Patent: Jun. 14, 2011

(54) BLOCK ARTIFACT PHENOMENON ELIMINATING DEVICE AND ELIMINATING METHOD THEREOF

(75) Inventors: Byung-Gyu Kim, Busan (KR);
Seon-Tae Kim, Daejeon (KR); Suk-Kyu Song, Daejeon (KR); Pyeong-Soo Mah, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1617 days.

(21) Appl. No.: 11/272,301

(22) Filed: Nov. 9, 2005

(65) Prior Publication Data
US 2006/0181740 A1 Aug. 17, 2006

(30) Foreign Application Priority Data

Dec. 8, 2004 (KR) .................. 10-2004-0103034
Jul. 4, 2005 (KR) .................. 10-2005-0059691

(51) Int. Cl.
*G06T 5/00* (2006.01)
*H04N 1/407* (2006.01)
*H04N 1/409* (2006.01)

(52) U.S. Cl. ........ 358/3.26; 358/3.27; 358/1.9; 358/1.1; 382/260; 382/265; 382/254; 382/275

(58) Field of Classification Search ........ 358/3.26–3.27, 358/1.9, 1.1; 375/E7.135, E7.162, E7.176, 375/E7.19; 345/611; 348/241–252, 606, 348/607–624; 382/254–275
See application file for complete search history.

(56) References Cited

U.S. PATENT DOCUMENTS

| 4,546,433 | A | * | 10/1985 | Tucker | 382/308 |
|---|---|---|---|---|---|
| 5,218,649 | A | * | 6/1993 | Kundu et al. | 382/180 |
| 5,335,298 | A | * | 8/1994 | Hevenor et al. | 382/199 |
| 5,852,475 | A | * | 12/1998 | Gupta et al. | 348/606 |
| 6,041,145 | A | * | 3/2000 | Hayashi et al. | 382/268 |
| 6,285,801 | B1 | * | 9/2001 | Mancuso et al. | 382/268 |
| 6,370,279 | B1 | * | 4/2002 | Paik | 382/268 |
| 6,408,109 | B1 | * | 6/2002 | Silver et al. | 382/300 |
| 6,529,638 | B1 | * | 3/2003 | Westerman | 382/275 |
| 2003/0053161 | A1 | * | 3/2003 | Li et al. | 358/532 |
| 2003/0053708 | A1 | * | 3/2003 | Kryukov et al. | 382/261 |
| 2004/0047514 | A1 | * | 3/2004 | Gallagher et al. | 382/270 |
| 2004/0057631 | A1 | | 3/2004 | Kim et al. | |
| 2004/0264800 | A1 | * | 12/2004 | Chu et al. | 382/268 |

FOREIGN PATENT DOCUMENTS

KR 10-2004-0034900 A 4/2004

OTHER PUBLICATIONS

ISO/IEC 14496-10 "International Standard: Information technology Coding of audio-visual objects, Part 10: Advanced video coding," 2003. T. Wiegand, et al, "Overview of the H.264/AVC video Coding Standard," IEEE Trans. Circuit and Sytem and Video Technology, pp. 1-19, Jul. 2003.
P. List, A. Joch, et al, "Adaptive Deblocking Filter," IEEE Trans. Circuit and System and Video Technology, vol. 13, pp. 614-619, Jul. 2003.
X. Sun, F. Wu, S. Li, and W. Gao, "In-loop Deblocking Filter for Block-based Video Coding," International Conference Signal Processing, pp. 33-36, 2002.

* cited by examiner

*Primary Examiner* — Benny Q Tieu
*Assistant Examiner* — Martin Mushambo
(74) *Attorney, Agent, or Firm* — Blakely, Sokoloff, Taylor & Zafman LLP (57) ABSTRACT

A device for eliminating a block artifact phenomenon of a decoded image frame, and an eliminating method thereof. A method for eliminating a block artifact phenomenon according to the present invention includes: extracting pixel information including a magnitude of edge response, an edge direction, and an edge position, by applying an edge detector to an arbitrary pixel in an image frame; distinguishing the pixel into a non-edge pixel, an object edge pixel, or a block edge pixel by using the extracted pixel information; and performing filtering according to the distinguishing result. In this manner, an object edge information is selectively protected, so that an improved image quality may be provided.

13 Claims, 5 Drawing Sheets

BLOCK ARTIFACT PHENOMENON ELIMINATING DEVICE AND ELIMINATING METHOD THEREOF

CROSS-REFERENCE TO RELATED APPLICATION

This application claims priority to and the benefit of Korean Patent Applications 10-2004-0103034 filed in the Korean Intellectual Property Office on Dec. 8, 2004, and 10-2005-0059691 filed in the Korean Intellectual Property Office on Jul. 4, 2005, the entire content of which are incorporated herein by reference.

BACKGROUND OF THE INVENTION (a) Field of the Invention

The present invention relates to a block artifact phenomenon eliminating device of a decoded image frame and an eliminating method thereof.

(b) Description of the Related Art

In most conventional image data encoding schemes, an image frame is processed block by block. In particular, according to encoding standards of image data such as MPEG (moving picture experts group), H.264, etc., image data is encoded based on blocks. In other words, in an encoding process of an image frame, a frame is divided into several blocks, and data processes are respectively performed based on each block. Here, blocking artifacts caused by a contour line of a block boundary may occur. This blocking artifact brings about image quality degradation and a user's visual discomfort.

This block artifact phenomenon is caused by a loss of low frequency band information occurring in encoding and quantization processes in which correlation between blocks is not considered. In more detail, a high frequency region (i.e., edge region), which does not exist in an original image frame that is not compressed, occurs in an image frame which is realized through encoding and decoding processes. The block artifact phenomenon destroys continuity among adjacent pixels. To prevent the block artifact phenomenon, a deblocking process, which eliminates the block artifact phenomenon by smoothing the high frequency region with a low pass filter, has been utilized.

In addition to the deblocking process using the low pass filter, another method for eliminating the block artifact phenomenon has been proposed. According to the method, pixels in a block are divided into inner block pixels and block boundary pixels, and low pass filtering strength is controlled according to the divided pixels. In addition, another low pass filtering method has been proposed, and according to the method, a set of pixels in which a difference between pixel values is larger than a predetermined threshold is selected among pixels neighboring a block boundary, and a predetermined virtual image frame is properly inserted therein in order to offset the pixel value difference around the block boundary. Accordingly, images may be controlled to be smooth around the block boundary, and visual discontinuity may be reduced.

However, even though the above-described conventional block artifact phenomenon eliminating methods can reduce the visual discontinuity occurring around the block boundary, the method also smoothes the high frequency region data (i.e., object edge) corresponding to contour lines of a person or an object located around the block boundary region. Accordingly, a problem that image quality is degraded occurs.

Therefore, it is required to determine accurately where the block artifact phenomenon occurs in an image in order to perform filtering for block artifact elimination. Otherwise, an edge region existing in the original image frame may be eliminated. In other words, the object edge may be misdetermined to be a block artifact, and may be eliminated. Consequently, image quality can be rather degraded after filtering.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a selective filtering device of an image frame and a method thereof having advantages of protecting an object edge in an image and effectively eliminating a block artifact phenomenon in restoring the image frame encoded based on blocks.

An exemplary eliminating method of a block artifact phenomenon for a block-based decoded image frame according to an embodiment of the present invention includes the following steps. Pixel information including a magnitude of edge response, an edge direction, and an edge position is extracted by applying an edge detector to an arbitrary pixel in the image frame. The pixel is distinguished between a non-edge pixel, an object edge pixel, and a block edge pixel by using the extracted pixel information. Filtering is performed according to the distinguishing result. Here, in the step distinguishing the pixel, the magnitude of edge response of the pixel is compared with a predetermined threshold value, and when the predetermined threshold value is larger, the pixel is distinguished as a non-edge pixel. When the magnitude of edge response is larger, it is determined whether the edge direction of the pixel is 0° or 90°, and when the edge direction is determined not to be 0° or 90°, the pixel is distinguished as an object edge pixel. When the edge direction is determined to be 0° or 90°, it is determined whether the pixel is located around a block boundary region by using the edge position information, and when the pixel is determined to be located around the block boundary region, the pixel is distinguished as a block edge pixel.

An exemplary eliminating device of a block artifact phenomenon of an image frame according to an embodiment of the present invention includes a pixel information extractor, an edge distinguisher, and a filter part. The pixel information extractor extracts pixel information including a magnitude of edge response, an edge direction, and an edge position by applying an edge detector to an arbitrary pixel in the image frame decoded based on a block. The edge distinguisher distinguishes the pixel into a non-edge pixel, an object edge pixel, and a block edge pixel by using the extracted pixel information. The filter part performs filtering according to the distinguishing result.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Figure 1:
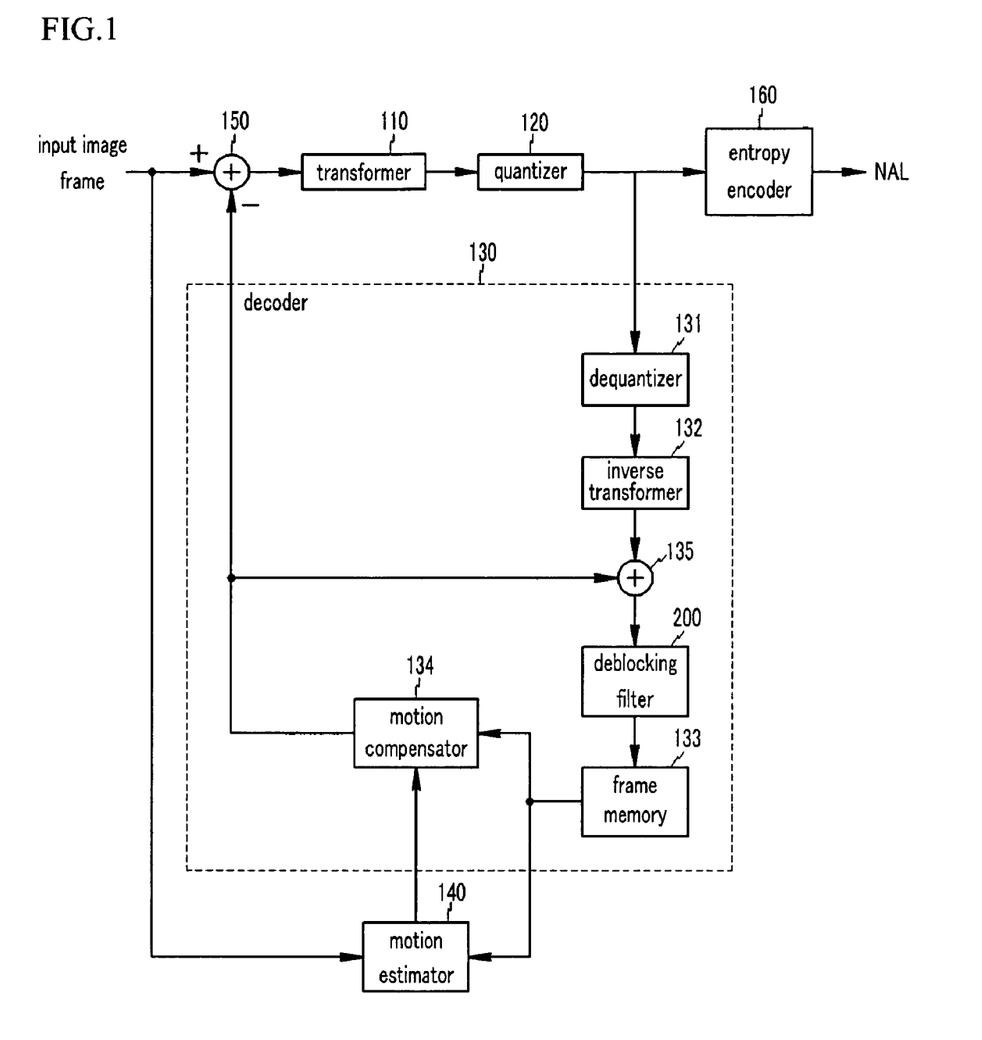
FIG. 1 is a block diagram of a motion picture encoding device according to an exemplary embodiment of the present invention.

FIG. 1 is a block diagram of a motion picture encoding device according to an exemplary embodiment of the present invention. As shown in FIG. 1, the motion picture encoding device according to an exemplary embodiment of the present invention includes a transformer 110, a quantizer 120, a dequantizer 131, an inverse transformer 132, a frame memory 133, a motion compensator 134, an adder 135, a motion estimator 140, a substractor 150, an entropy encoder 160, and a deblocking filter 200. Here, the motion picture encoding device shown in FIG. 1 may be an encoding device of the H.264 standard.

An image frame is input based on a macro block. The image frame is transformed by the transformer 110 according to a predetermined scheme, and is then quantized by the quantizer 120. Here, an image data transformation scheme used in the transformer 110 may be a discrete cosine transform (DCT) scheme or a discrete wavelet transform (DWT) scheme.

The image frame quantized by the quantizer 120 is decoded through the dequantizer 131 and the inverse transformer 132, and decoded data is input to the adder 135.

By the deblocking filter 200, pixel information is extracted from the decoded data output from the adder, edge characteristics are determined, and the decoded data output from the adder is selectively filtered according to the determined edge characteristics. The filtered data is restored to an actual image, and is stored in the frame memory 133. Here, the restored image frame stored in the frame memory 133 may be provided as a reference image for motion estimation. The filtering according to a result of the determined edge characteristics performed by the deblocking filter 200 will be described in detail.

The motion estimator 140 performs a motion estimation for a currently input macro block based image frame with reference to at least one reference image stored in the frame memory 133, and outputs a motion vector, an index representing the reference image, and motion data including block mode.

The motion compensator 134 extracts the macro block based image frame corresponding to a currently input macro block from the reference image stored in the frame memory 133 according to the data received from the motion estimator 140, and outputs it. The data output from the motion compensator 134 is input to the adder 135, and decoded data input to the other end of the adder 135 is allowed to be restored to a real image and to be transmitted to the deblocking filter 200, so that a blocking artifact eliminating process may be performed.

The substractor 150 receives a macro block in the reference image corresponding to the input macro block from the motion compensator 134, performs a difference operation with the input macro block, and outputs a residual signal, when interframe predictive coding is performed for the macro block input to the motion picture encoding device. The output residual signal is transformed and quantized through the transformer 110 and the quantizer 120, is entropy-encoded by the entropy encoder 160, then is output in a form of network abstraction layer (NAL) unit data.

The image frame data output from the entropy encoder 160 may be temporarily stored in a buffer (not shown) in order to control a bit rate.

In the motion picture encoding device shown in FIG. 1, the dequantizer 131, the inverse transformer 132, the frame memory 133, the motion compensator 134, the adder 135, and the deblocking filter 200 may form a decoder 130 for decoding encoded image data in the motion picture encoding device.

Figure 2:
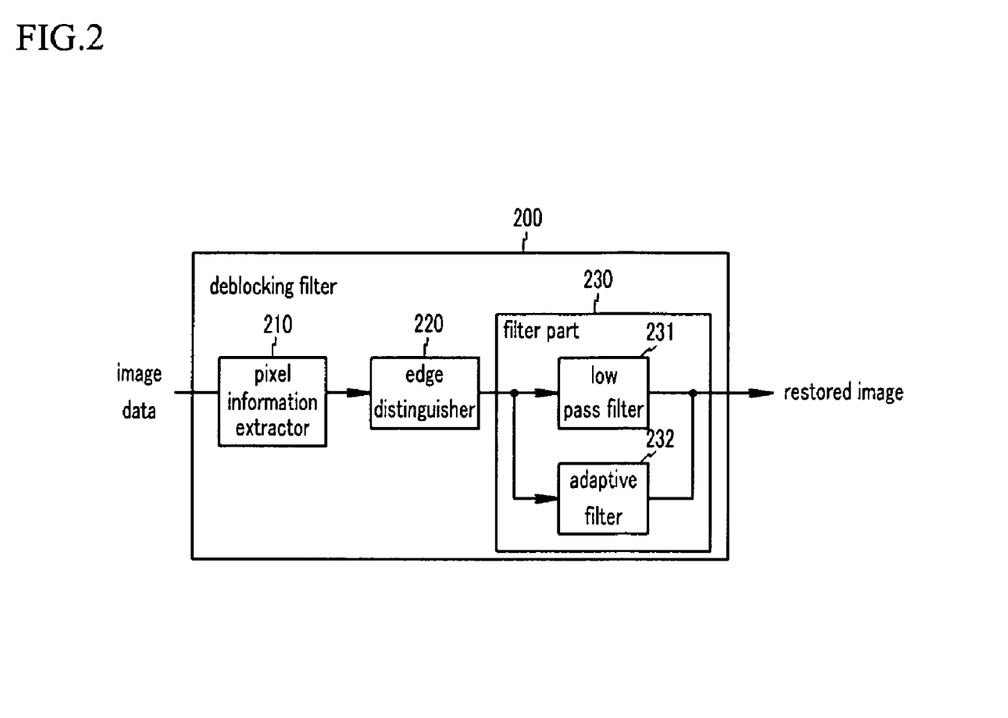
FIG. 2 is a block diagram of a deblocking filter according to an exemplary embodiment of the present invention.
Figure 3:
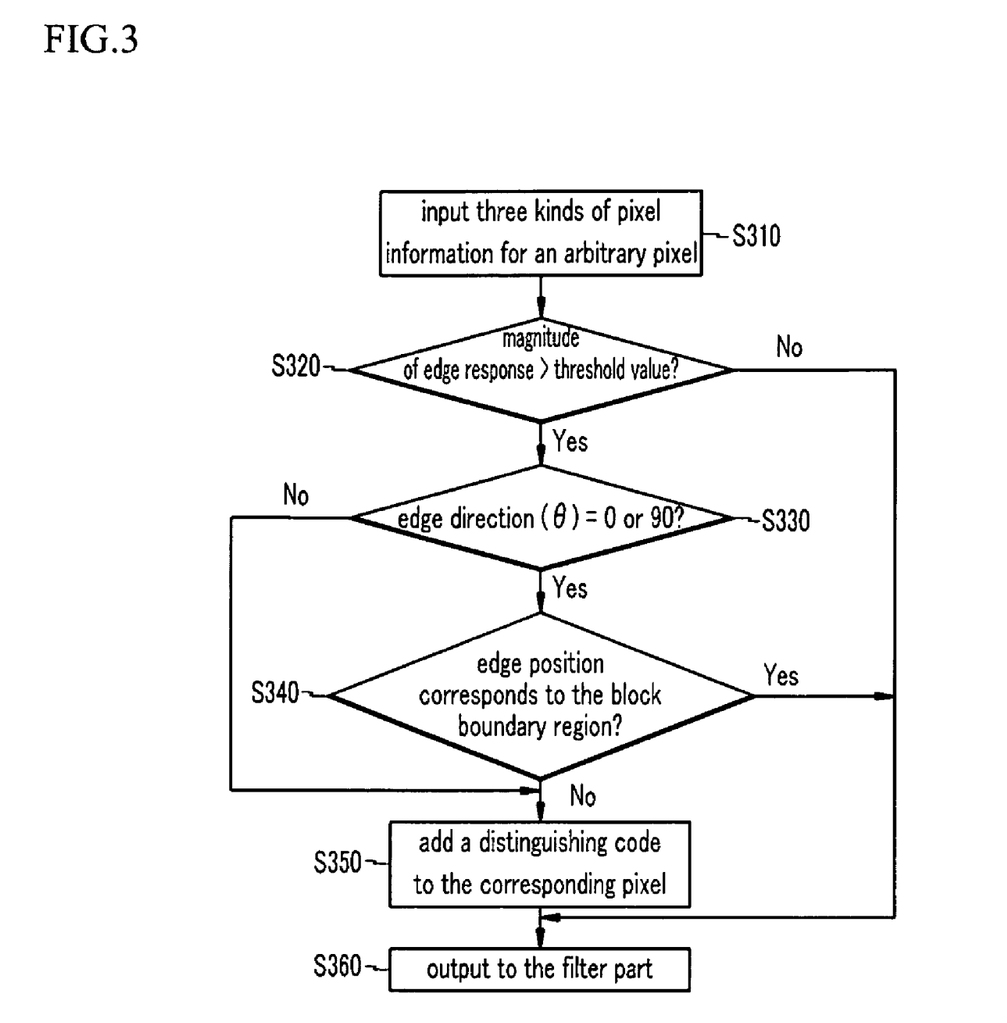
FIG. 3 is a flowchart showing an edge characteristic distinguishing method according to an exemplary embodiment of the present invention.

FIG. 2 is a block diagram of the deblocking filter 200 according to an exemplary embodiment of the present invention, and FIG. 3 is a flowchart showing an edge characteristic distinguishing process performed in an edge distinguisher 220.

As shown in FIG. 2, the deblocking filter 200 includes a pixel information extractor 210, an edge distinguisher 220, and a filter part 230.

The filter part 230 includes a low pass filter 231 and an adaptive filter 232.

According to an exemplary embodiment of the present invention, edge characteristic information included in each pixel is extracted by analyzing decoded original image data, and selective filtering is performed based on the extracted information.

This is for preventing the image quality degrading phenomenon of the conventional block artifact phenomenon eliminating schemes which is caused because the object edge information located around the block boundary existing in the original image is also filtered by low pass filtering with block boundary edge information.

The pixel information extractor 210 performs a pre-step for distinguishing edge pixels in the original image having passed through an inverse transform and dequantization.

In other words, the pixel information extractor 210 extracts edge information included in the pixel by using an edge detector.

As the edge detector, a Sobel edge detector, a Canny edge detector, or another compatible edge detector may be used.

The pixel information extractor 210 extracts the three pixel information factors below in order to efficiently grasp edge information used in distinguishing the pixel characteristics.

1. Magnitude of Edge Response (M)

Magnitude of edge response (M) may be defined to be an absolute value of a response magnitude which is given by applying the edge detect operator to the decoded original image data, and may be obtained by Equation 1.

$$M(i,j)=|f(i,j)\times K(m,n)| \qquad \text{[Equation 1]}$$

In Equation 1, (i,j) indicates a location of an arbitrary pixel in block based data which is input after being decoded, and M(i,j) indicates the magnitude of the edge response of a corresponding pixel.

f(i,j) indicates a pixel quotient representing brightness, luminance, and color of an arbitrary pixel in the input original image, and f(i,j) it can be properly selected and utilized according to characteristics of the motion picture encoding device and an operation policy thereof.

K(m, n) indicates a two-dimensional edge detect operator.

(m, n) is an index in an edge mask used for edge detecting, and is a differential operator.

At an edge, there are significant changes in shading and color of the image. Therefore, a differential operation may be utilized in extracting a contour line.

Generally, the edge detector is a kind of differential filter.

In an image, a pixel having a large brightness changing ratio along the horizontal axis and the vertical axis, in other words a large differential coefficient, becomes an edge.

By using such a characteristic, the edge detecting is performed by applying a 3_3 mask composed of differential operators to a predetermined pixel in image data.

For example, when using a Sobel edge operator, the Sobel edge operator applies two kinds of edge masks respectively having nine differential operators, which are horizontal directional edge masks for edge detecting and vertical directional edge masks for edge detecting.

The differential operator components of the Sobel edge mask are given in the following tables. The second row and the second column component is a differential operator corresponding to a predetermined pixel for detecting the horizontal directional and the vertical directional edge components.

TABLE 1 horizontal edge detector

| -1 | 0 | 1 |
|---|---|---|
| -2 | 0 | 2 |
| -1 | 0 | 1 |

TABLE 2 vertical edge detector

| -1 | -2 | -1 |
|---|---|---|
| 0 | 0 | 0 |
| 1 | 2 | 1 |

2. Edge Direction (θ)

Edge direction means a ratio between a vertical direction component and a horizontal direction component in a pixel.

This is defined by Equation 2.

Equation 2 uses $E_x$ and $E_y$ which are respectively a horizontal axis component and a vertical axis component of an edge detector response obtained by applying the edge detector to a predetermined pixel.

$$\theta(i, j) = \arctan\left(\frac{E_y}{E_x}\right) \quad (0° \leq \theta(i, j) < 180°) \quad \text{[Equation 2]}$$

Here, $E_x$ is given by applying a horizontal edge detector to the image data.

Hereinafter, a case of applying a Sobel edge detector of the horizontal direction shown in Table 1 to a 3_3 pixel block centered by the predetermined pixel will be described.

When assuming pixels of the 3_3 block in the original decoding data input from the pixel information extractor 210 to be respectively [a,b,c], [d,e,f], and [g,h,k] from the first row down direction, a target pixel (i,j) for extracting pixel information is a pixel corresponding to 'e' located in the block center, and $E_x$ is given as {((-1)_a)+0_b+1_c+((-2)_d)+0_e+ 2_f+((-1)_g)+0_h+1_k}.

$E_y$ can be obtained similarly by using the Sobel edge detector of the vertical direction shown in Table 2.

When θ(i,j) obtained by using $E_x$, $E_y$ and Equation 2 is 0° or 90°, the predetermined pixel may be determined to have a horizontal axis or a vertical axis directional component.

Then, the pixel may be determined to correspond to the block boundary region or the object edge.

3. Edge Position ([i,j])

Edge position information [i,j] is defined to be a location in rectangular coordinates of block based image data which is decoded and is input to the pixel information extractor 210.

It may be determined whether a pixel corresponds to the block boundary region by using the edge position information.

The edge distinguisher 220 determines whether a pixel corresponds to the edge region by using three kinds of pixel information (i.e., magnitude of edge response (M), edge direction (θ), and edge position information ([i,j]), which are extracted by the pixel information extractor 210.

Image data is a gathering of pixels having edge information and pixels not having edge information.

Therefore, pixels in a homogeneous region not having edge information exist in the edge information extracting process.

The edge distinguisher 220 distinguishes pixels into three kinds. They are a non-edge pixel corresponding to the homogeneous region, an object edge pixel corresponding to a person or object contour line, and a block edge pixel corresponding to the block boundary region generated in a block based encoding process.

Moreover, the edge distinguisher 220 distinguishes pixels causing the block artifact phenomenon and edge pixels not causing the block artifact phenomenon, and allows selective filtering, so that the object edge information may be preserved.

Hereinafter, referring to FIG. 3, a pixel characteristic distinguishing method will be described in detail.

When the three kinds of pixel information (i.e., magnitude of edge response (M), edge direction (θ), and edge position ([i,j]) extracted by the pixel information extractor 210 for determining the edge characteristics are input to the edge distinguisher 220, the edge distinguisher 220 begins the edge characteristic distinguishment for an arbitrary pixel in step S310.

Firstly, when a selected pixel's magnitude of edge response (M) is less than a predetermined threshold value, so the pixel is determined to be a pixel in the homogeneous region in which the person's or object's contour lines do not exist, the edge distinguisher 220 determined the pixel to be a non-edge pixel, and transmits pixel data to the filter part 230 without another additional process in step S320, and S360.

Figure 4:
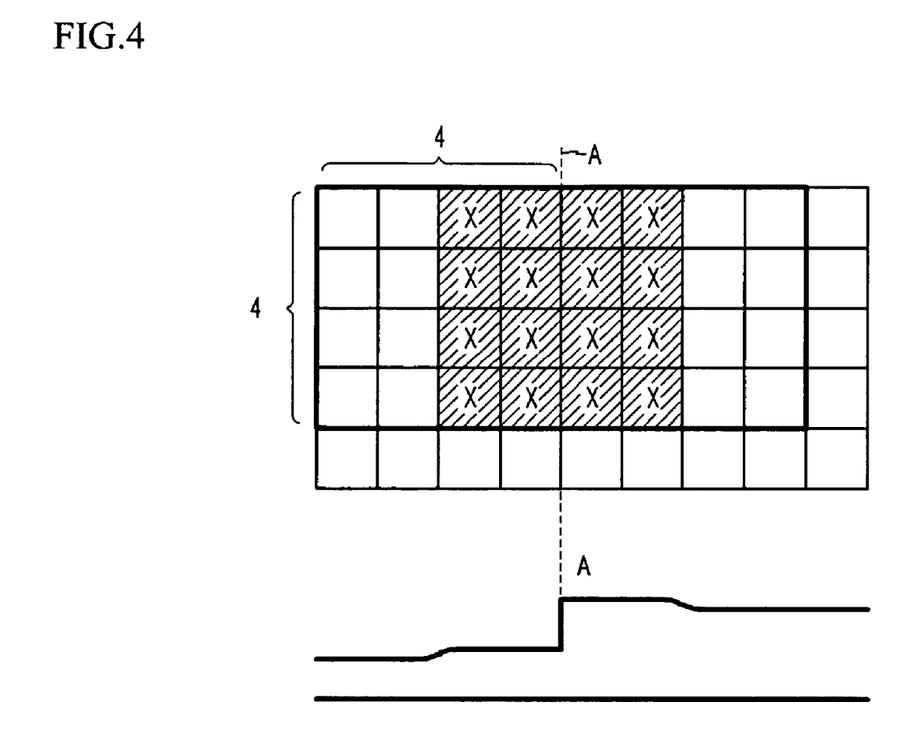
FIG. 4 shows a block artifact phenomenon occurring around a block boundary in a homogeneous region.

FIG. 4 shows the block artifact phenomenon occurring in the homogeneous region.

In FIG. 4, one lattice represents one pixel, and the case of 4_4 block-based decoding is illustrated.

As shown in FIG. 4, a region of 2 right and left pixels around line A corresponding to the block boundary is a target region in a general deblocking process. In other words, the pixels marked by 'X' represent a target region of the vertical edge process in the deblocking process.

In addition, as shown in FIG. 4, the magnitude of the edge response changes sharply around the block boundary. Therefore, the edge distinguisher 220 uses this characteristic in determining the block edge pixel by setting up a threshold value according to the characteristics of the image frame input to the motion picture encoding device.

On the other hand, when the selected pixel's magnitude of edge response (M) is greater than the predetermined threshold value, the pixel corresponds to the object edge pixel or the block edge pixel. Then, it is determined that the edge direction ($\theta$) is the horizontal axis direction or the vertical axis direction in step S330.

As shown in FIG. 4, the block edge pixels located around the boundary region have a horizontal or vertical directional edge component. Therefore, it is determined that $\theta$ is 0° or 90°.

When the selected pixel is determined to have a horizontal or vertical directional edge component, it is probable that the pixel is a block edge pixel. However, for more accurate judgment, the edge distinguisher 220 determines whether the selected pixel corresponds to the block boundary region by using the edge position information ([i,j]) obtained by the pixel information extractor 210. When the pixel corresponds to the block boundary region, the pixel is determined to be a block edge pixel, and is output to the filter part 230 without any further data processing in step S340, and S360.

Even when $\theta$ is 0° or 90°, the pixel can be an object edge (i.e., contour line of the object). Therefore, when the pixel is mis-determined to be the block edge and is filtered by the low pass filter, the image quality may be degraded. The above-described process is for preventing such a phenomenon.

When the selected pixel is determined not to have the vertical or horizontal directional edge component in step S330, or when the pixel is determined not to be located in the block boundary region even though having the vertical or horizontal directional edge component in step S340, the edge distinguisher 220 determines the pixel to be an object edge pixel, adds a distinguishing code representing the object edge to the pixel, and outputs it to the filter part in step S350, and S360.

Figure 5:
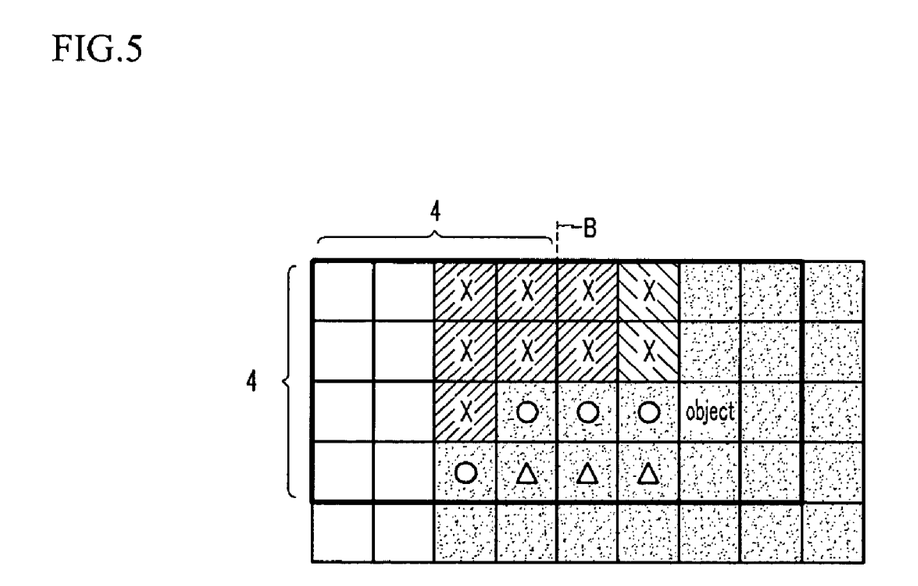
FIG. 5 illustrates a block edge and an object edge in a decoded image data.

FIG. 5 shows an example of the block edge pixel and the object edge pixel.

Similar to FIG. 4, in the general deblocking process, pixels marked with 'X', 'O', and '_' in two blocks divided by line 'B' are all region pixels of the block artifact phenomenon eliminating deblocking process.

However, the pixels marked with 'O' correspond to the object's contour line region having a horizontal or vertical directional edge component. Therefore, they are distinguished as the object edge pixels, and are not the target of the deblocking process.

The pixels marked with '_' correspond to the homogeneous regions which are inner sides of the objects, and they are distinguished to be non-edge pixels.

When determining the characteristics of the pixels only with the magnitude of edge response and the edge directional components, the object edge pixels shown in FIG. 5 are determined to be the block edge pixels, and they may then be processed by the low pass filtering.

Therefore, in an exemplary embodiment of the present invention, the edge position information is additionally used in determining the characteristics of the pixel.

In the H.264 scheme, since the encoding and decoding are performed based on 4_4 blocks, the block edge pixel is determined with reference to the edge position information such as [1,1] and [1,2], and by confirming whether each pixel corresponds to the block boundary region.

When using other encoding schemes, the basic block unit which is a reference of the decoding can be changed according to the encoding schemes, and the edge position information which is a reference of determining the block boundary region may be also changed.

The filter part 230 includes a low pass filter 231 and an adaptive filter 232.

The low pass filter 231 performs elimination of the block artifact phenomenon by reducing the blocking artifact of the block edge pixel.

The pixel determined to be the non-edge pixel or block edge pixel by the edge distinguisher 220 is input to the low pass filter 231, and the low pass filtering for the pixels is performed selectively.

The non-edge pixel input to the low pass filter 231 barely includes high frequency region components. Therefore, the pixel information thereof is not damaged even when passing through the low pass filtering.

As the low pass filter 231, an in-loop deblocking filter defined by the H.264 standard may be used.

The adaptive filter 232 performs selective filtering to the pixel determined to be the object edge pixel by the edge distinguisher 220.

The adaptive filter 232 selectively filters the pixels with the distinguishment code representing the object edge in order to preserve the object edge pixels.

Since the adaptive filter 232 is for protecting the object edge information, an all-pass filter of which the gain is 1 may used, or a sharpening filter for reinforcing the edge component may be used as the adaptive filter 232.

In an exemplary embodiment of the present invention, it has been described that the non-edge pixel is input to the low pass filter 231, but it is also possible that the non-edge pixel is input to the adaptive filter 232.

Figure 6:
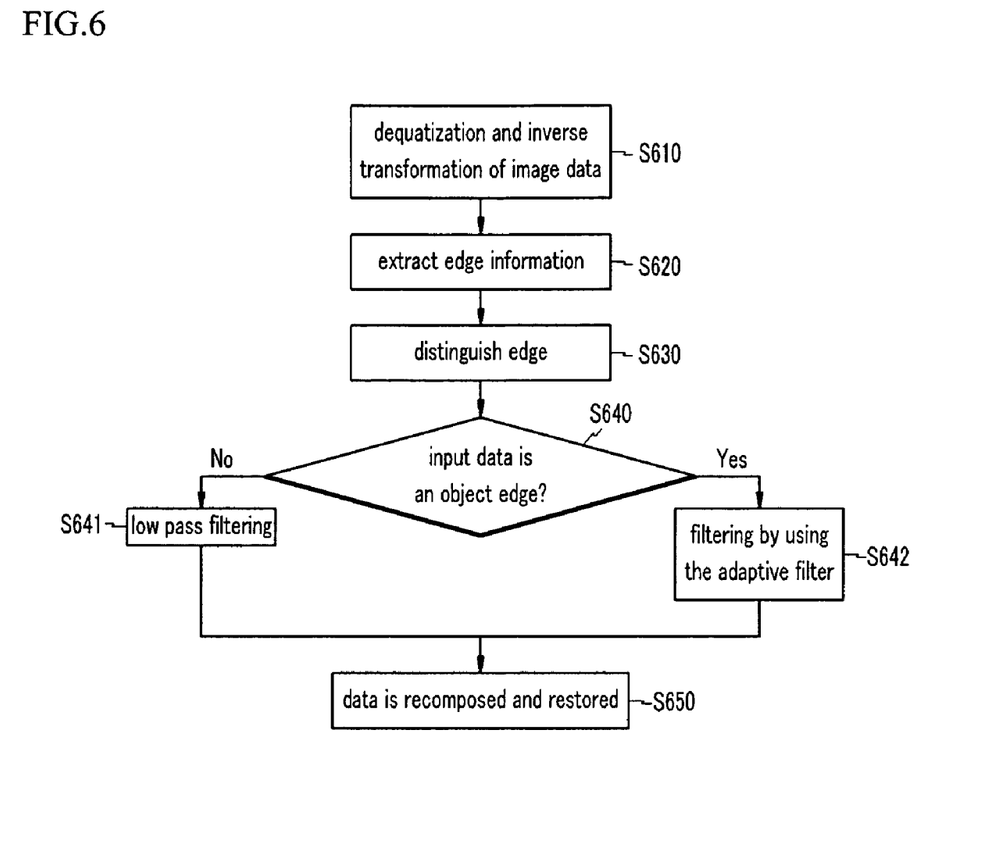
FIG. 6 is a flowchart showing a selective filtering method for image data according to an exemplary embodiment of the present invention.

FIG. 6 is a flowchart illustrating a selective filtering method of image data according to an exemplary embodiment of the present invention.

An image frame compressed based on block units passes through the dequantization and inverse transform processes, and is transformed into original decoding data in step S610.

The pixel information extractor 210 receiving the original decoding data extracts the three kinds of pixel information (i.e., magnitude of edge response (M), edge direction ($\theta$), and edge position ([i,j]) used in distinguishing the pixels having the edge characteristic from the original decoding data in step S620.

The edge distinguisher 220 distinguishes the pixels included in the original decoding data into the non-edge pixel, the block edge pixel, and the object edge pixel by sequentially using the magnitude of edge response, the edge direction, and the edge position information obtained by the pixel information extractor 210 according to the process shown in FIG. 3, and adds the distinguishing code to the object edge pixel in step S630.

The filter part 230 determines whether the pixel received from the edge distinguisher 220 has the distinguishing code. When the pixel is determined to be the object edge pixel because it has the distinguishing code, the filter part 230 performs the filtering by using the adaptive filter 232 in step S640, and S642.

On the other hand, when the pixel is not an object edge pixel, the filter part 230 performs the deblocking process for eliminating the high frequency component through the low pass filter 231 in step S640, and S641.

Then, the pixels processed by the two kinds of filters are recomposed, and are output in an image frame in step S650.

Here, the pixels may be recomposed and restored by using the following Equation 3 in order to protect the object edge existing in the original image.

$$f(i,j) = a \cdot f_A(i,j) + b \cdot f_L(i,j) \quad \text{[Equation 3]}$$

In Equation 3, $f_A(i,j)$ indicates the image data output by the adaptive filter 232, and $f_L(i,j)$ indicates the image data output by the low pass filter 231.

In addition, a and b are weight values applied to the image data. They may be variable according to characteristics of the motion picture encoding device, and characteristics of an input image frame.

Equation 3 is for obtaining a weighted average of an image frame, and (a+b) may be '1'.

For example, a may be set to be '0' so that the non-edge pixel and the block edge pixel are processed according to the conventional deblocking scheme, and b may be set to be 0.7 to 1 for the object edge pixel.

Through Equation 3, a process emphasizing the edge of the original image may be enabled rather than the deblocking process by the low pass filtering. Accordingly, the image quality degradation caused by an indiscriminate deblocking process of the edge pixel may be prevented.

In an exemplary embodiment of the present invention, it has been described that all the pixels are input to the two kinds of filters in the filter part 230, the distinguishing code is added to the object edge pixel, and the object edge pixel is processed by the adaptive filter 232.

However, it is also possible to control the pixel determined to be an object edge pixel by the edge distinguisher 220 to be input to the adaptive filter 232, and to control the other pixels to be input to the low pass filter 231.

According to an exemplary embodiment of the present invention, the pixel characteristics are determined by using the pixel information in the image frame, and the pixels determined to be the object's contour line region are distinguished and selectively filtered. By this, the image quality degradation may be prevented.

In addition, natural object edge components of the original image may be selectively preserved while effectively eliminating the block boundary artifacts, so that a much clearer image may be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for eliminating a block artifact phenomenon of a block based decoded image frame, the method comprising:

extracting pixel information comprising a magnitude of edge response, an edge direction, and an edge position by applying an edge detector to an arbitrary pixel in the image frame;

distinguishing the pixel between a non-edge pixel, an object edge pixel, and a block edge pixel by using the extracted pixel information, wherein distinguishing the pixel further comprises comparing the magnitude of edge response of the pixel with a predetermined threshold value, and when the predetermined threshold value is greater, distinguishing the pixel as a non-edge pixel wherein distinguishing the pixel further comprises:

when the magnitude of edge response is larger, determining whether the edge direction of the pixel is 0° or 90°, and when the edge direction is determined not to be 0° or 90°, distinguishing the pixel as an object edge pixel; and when the edge direction is determined to be 0° or 90°, determining whether the pixel is located around a block boundary region by using the edge position information, and when the pixel is determined to be located around the block boundary region, distinguishing the pixel as a block edge pixel; and performing filtering according to the distinguishing result.

2. The method for eliminating a block artifact phenomenon of claim 1, wherein the magnitude of edge response is an absolute value of a response obtained when applying the edge detector to the pixel.

3. The method for eliminating a block artifact phenomenon of claim 2, wherein the magnitude of edge response is given by the following equation $$M(i,j) = |f(i,j) \times K(m,n)|, \text{ wherein:}$$

(i,j) is a position of the arbitrary pixel;
M(i,j) is the magnitude of edge response of the pixel;
f(i,j) is a pixel value of the pixel; and
K(m, n) is a two-dimensional edge detect operator.

4. The method for eliminating a block artifact phenomenon of claim 1, wherein the edge direction information is an arctangent of a ratio between a horizontal component and a vertical component of an edge detector response.

5. The method for eliminating a block artifact phenomenon of claim 1, wherein the edge position is a relative location in a block in which the pixel is comprised, expressed in coordinates.

6. The method for eliminating a block artifact phenomenon of claim 1, wherein the edge detector may be a Sobel edge detector or a Canny edge detector.

7. The method for eliminating a block artifact phenomenon of claim 1, the method further comprising, when the edge direction is determined to be 0° or 90°, but the edge position is determined not to be located around the block boundary region, determining the pixel to be an object edge pixel.

8. The method for eliminating a block artifact phenomenon of claim 7, wherein, in performing the filtering, a pixel distinguished as a non-edge pixel or a block edge pixel from the pixels in the decoded image frame is processed by low pass filtering.

9. The method for eliminating a block artifact phenomenon of claim 7, wherein, in performing the filtering, a pixel distinguished as an object edge pixel from the pixels in the decoded image frame is processed by all-pass filtering or sharpening filtering.

10. The method for eliminating a block artifact phenomenon of claim 7, the method further comprising adding a distinguishing code to a pixel distinguished as an object edge pixel from the pixels in the decoded image frame.

11. A device for eliminating a block artifact phenomenon of an image frame, comprising:

a pixel information extractor for extracting pixel information comprising a magnitude of edge response, an edge direction, and an edge position by applying an edge detector to an arbitrary pixel in an image frame decoded based on a block;

an edge distinguisher for distinguishing the pixel into a non-edge pixel, an object edge pixel, and a block edge pixel by using the extracted pixel information, wherein distinguishing the pixel further comprises comparing the magnitude of edge response of the pixel with a predetermined threshold value, and when the predetermined threshold value is greater, distinguishing the pixel as a non-edge pixel, wherein distinguishing the pixel further comprises:

when the magnitude of edge response is larger, determining whether the edge direction of the pixel is 0° or 90°, and when the edge direction is determined not to be 0° or 90°, distinguishing the pixel as an object edge pixel; and when the edge direction is determined to be 0° or 90°, determining whether the pixel is located around a block boundary region by using the edge position information, and when the pixel is determined to be located around the block boundary region, distinguishing the pixel as a block edge pixel; and a filter part for performing filtering according to the distinguishing result.

12. The device for eliminating a block artifact phenomenon of an image frame of claim 11, wherein the filter part comprises:

a low pass filter for eliminating a high frequency component having a non-edge pixel and a block edge pixel; and an adaptive filter for performing filtering while preserving edge information of the object edge pixel.

13. The device for eliminating a block artifact phenomenon of an image frame of claim 12, wherein the adaptive filter is one of a full band pass filter and a sharpening filter.

* * * * *